United States Patent [19]

Nelson

[11] Patent Number: 4,610,265
[45] Date of Patent: Sep. 9, 1986

[54] TURBINE COMPRESSOR STALL RECOVERY VALVE

[75] Inventor: Thomas Nelson, Rockford, Ill.

[73] Assignee: Sundstrand Corporation, Rockford, Ill.

[21] Appl. No.: 682,272

[22] Filed: Dec. 12, 1984

[51] Int. Cl.⁴ .......................................... F16K 31/124
[52] U.S. Cl. .................................. 137/219; 251/30.01
[58] Field of Search ................ 137/219, 220, 221, 222

[56] References Cited

U.S. PATENT DOCUMENTS

| 3,038,500 | 6/1962 | Lansky et al. | 137/596.15 |
| 3,092,132 | 6/1963 | Guy et al. | |
| 3,380,469 | 4/1968 | Salerno et al. | |
| 3,566,907 | 3/1971 | Sime et al. | |
| 3,792,713 | 2/1974 | Zadoo | 137/220 X |
| 3,792,716 | 2/1974 | Sime et al. | |
| 3,825,026 | 7/1974 | Salerno et al. | |
| 3,865,128 | 2/1975 | Zadoo | 137/220 |

Primary Examiner—Gerald A. Michalsky
Attorney, Agent, or Firm—Wood, Dalton, Phillips, Mason & Rowe

[57] ABSTRACT

Response time to an actuating signal of an in-line valve including a sleeve (26) closeable against the seat (24) by reciprocal movement within a body (10) on a guide (44) is minimized by providing an actuating chamber (86) bounded by the complementary, mating surfaces (82, 84) so that less pressurizing fluid need be introduced into the chamber (86) to cause actuation. Response time is further enhanced by making the guide (44) in the form of a tube which vents the interface between an annular wall (62) and a web (30) on the sleeve (26) against which pressure in the chamber (86) acts.

4 Claims, 3 Drawing Figures

TURBINE COMPRESSOR STALL RECOVERY VALVE

FIELD OF THE INVENTION

This invention relates to an in-line valve, and more particularly, to an in-line valve whose response is extremely rapid such that it may be used to vent bleed air from the compressor stage of a turbine engine to avert an impending compressor stage stall.

BACKGROUND OF THE INVENTION

Prior art of possible relevance to in-line valves includes U.S. Pat. Nos. 3,092,132 issued June 4, 1963 to Guy et al; 3,792,716 issued Feb. 19, 1974 to Sime et al; and 3,825,026 issued July 23, 1974 to Salerno et al. Prior art dealing with bleed air and/or stall characteristics of turbine engines includes U.S. Pat. Nos. 3,915,587 issued Oct. 28, 1975 to Rannenberg and 4,117,668 issued Oct. 3, 1978 to Elsaesser et al.

Those knowledgeable in the field of turbine engines have long been aware of the deleterious effect of a so-called "compressor section stall". As a consequence, a great deal of effort has been expended in developing various proposals to avert the difficulty.

Many of these proposals involve modification of fuel flow to the combustor section of the engine upon the onset of a stall coupled with an increase in the rate of flow of bleed air from one or more stages of the compressor section.

While such proposals are effective, they have been hampered to some degree, by the difficulty in detecting an impending stall in the compressor section of the engine. In particular, the difficulty incurred in detecting an impending stall has resulted in, in some instances, insufficient time for mechanical instrumentalities as, for example, bleed air valves for the turbine compressor stage to respond to prevent a stall, and thus the consequences of the stall.

The present invention is directed to overcoming the above problem.

SUMMARY OF THE INVENTION

It is the principal object of the invention to provide a new and improved in-line valve which may be coupled to the compressor section of a turbine engine and which responds to an actuating signal with extreme rapidity so as to provide positive stall prevention even when signalled by conventional stall detection systems.

An exemplary embodiment of the invention achieves the foregoing object in an in-line valve assembly for connection to at least one bleed air port in the compressor section of a turbine engine. The in-line valve includes a generally cylindrical valve body having opposed open ends with one of the ends being adapted to serve as an inlet and the other of the ends being adapted to serve as an outlet. An annular valve seat is disposed within the body adjacent the outlet end and a sleeve of lesser diameter than the valve body is disposed within the valve body and includes an annular valve surface to sealingly abut the seat. The sleeve has an internal, generally diametral web intermediate its ends and the web has a central opening.

At least one strut is disposed within the valve body and extends generally radially inwardly at a location on the outlet side of the seat. An axial guide is mounted on the strut and is directed through the central opening in the web to slidably mount the sleeve for reciprocal movement toward and away from the seat.

A first annular wall is mounted on the guide at the end thereof remote from the outlet and slidably sealingly engages the interior of the sleeve on one side of the web. A compression spring is interposed between the first annular wall and the web for biasing the sleeve toward the seat and means are provided for venting the interface between the web and the first annular wall.

A second annular wall is located on the guide between the seat and the web and slidably sealingly engages the interior of the sleeve. The web, the sleeve and the second annular wall define a variable volume chamber for receiving a pressure signal adapted to bias the sleeve away from the seat. The web and the second annular wall, at their facing sides, have complementary configurations which closely mate to minimize the volume of the chamber when the annular valve surface abuts the seat to thereby maximize the response of the sleeve to the pressure signal and a fluid passage is located in the strut and extends through the second annular wall to be in fluid communication with the chamber by which the pressure signal may be applied thereto.

In a preferred embodiment, the guide is a tube having one end opening downstream of the seat and the other end in fluid communication with the interface between the web and the first annular wall to provide the venting means. The venting of such interface further provides improved response of the sleeve to a pressure signal.

In a highly preferred embodiment, the fluid passage is associated with a three-way control valve and specifically, a first port thereof. A second port of the control valve is adapted to be connected to a source of fluid under pressure and a third port is adapted to be connected to vent. A valve member is movable to alternately establish fluid communication between the first and second ports or between the first and third ports and a motor is provided for moving the valve member. The invention contemplates that the three-way valve have a valve chamber with opposed seats respectively associated with the second and third ports with the valve member being movable within the valve chamber between the seats. The first port opens to the valve chamber.

The motor for the valve member is preferably a solenoid having a spring biased armature normally urging the valve member against the seat associated with the second port.

In a highly preferred embodiment of the invention, an accumulator is in fluid communication with the second port to thereby provide a source of actuation pressure for the sleeve.

Other objects and advantages will become apparent from the following specification taken in connection with the accompanying drawings.

DESCRIPTION OF THE PREFERRED EMBODIMENT

Figure 1:
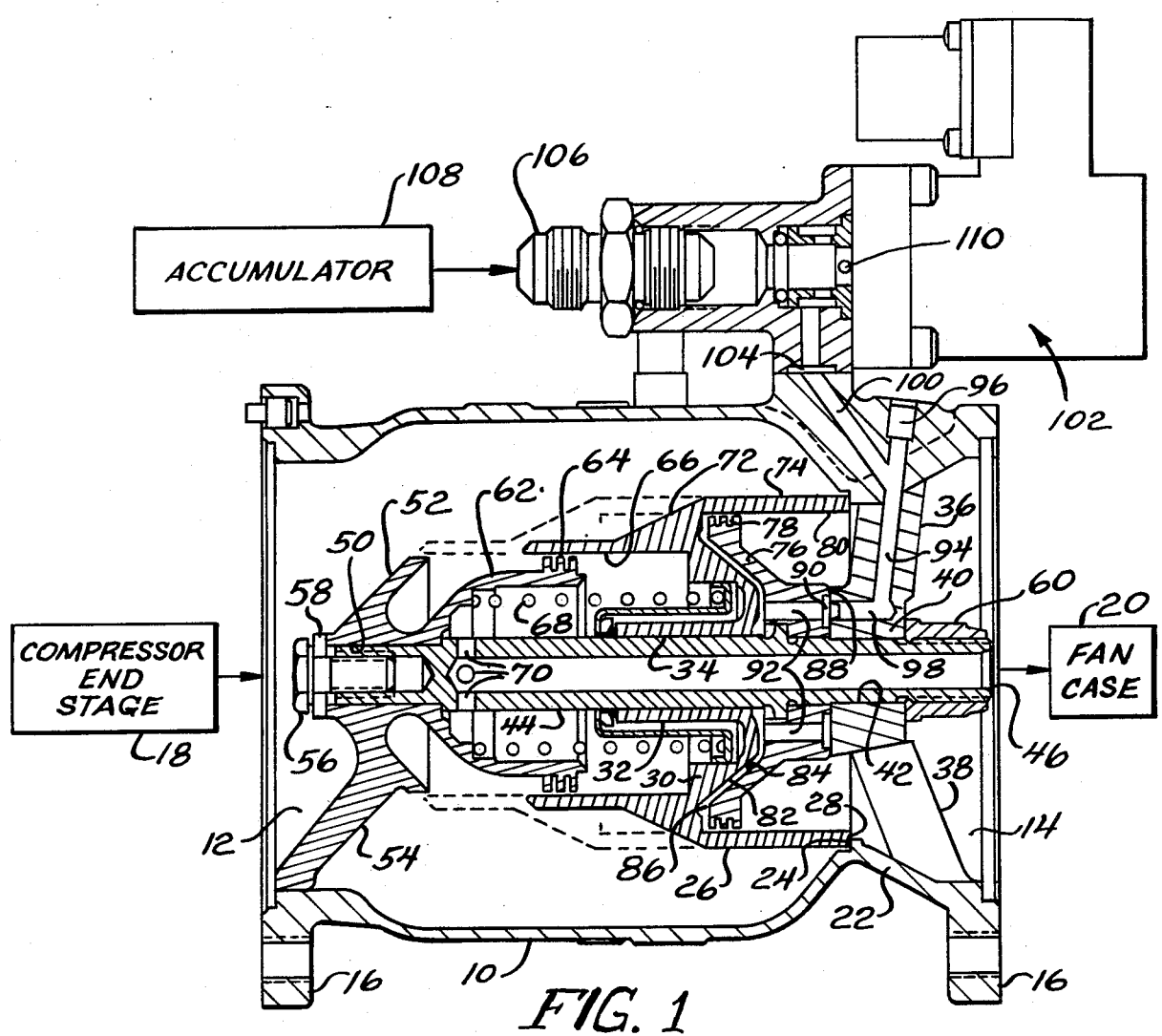
FIG. 1 is a sectional view of a valve made according to the invention with environmental components illustrated somewhat schematically.

An exemplary embodiment of a valve assembly made according to the invention is illustrated in the drawings and with reference to FIG. 1 is seen to include a generally cylindrical, duct-like valve body 10. The body 10 has opposed open ends 12 and 14 with the end 12 serving as an inlet and the end 14 serving as an outlet. At the openings 12 and 14, the body 10 may include flanges 16 whereby the body 10 can be secured in a system in which it is used.

As schematically illustrated in FIG. 1, the inlet 12 may be connected to the bleed air ports of at least one stage of the compressor section of a turbine engine, shown schematically at 18. The outlet 14, where the engine is a turbofan engine, will typically be connected in fluid communication with the fan case 20 of such engine.

Adjacent the outlet 14, the valve body 10 is necked inwardly as at 22 such that the interior of the body 10 in the vicinity thereof provides an annular valve seat 24.

A sleeve valve 26 of lesser diameter than the body 10 is disposed within the latter and is reciprocably movable from the solid line position shown whereat an annular valve surface 28 on the sleeve valve 26 is in sealing abutment with the seat 24, to the dotted line position illustrated whereat the valve surface 28 is separated from the seat 24 and the valve is open.

The sleeve valve 26, intermediate its ends, includes a web 30. At its radially inner end, the web 30 terminates in an axially directed, integral collar 32 having a central opening 34.

A plurality of generally radially extending struts, two of which are shown at 36 and 38, are mounted on the interior of the valve body 10 downstream of the seat 24 and join a centrally located hub 40. The hub 40 includes a central bore 42 in which an axially extending, elongated, guide tube 44 is received. The tube 44 has an open end 46 downstream of the seat 24 at the outlet opening 14.

The opposite end of the tube 44 is mounted, adjacent the inlet, in a bore 50 formed in a deflector nose 52 mounted within the body 10 by a strut 54. The tube 44 is secured in place as by a bolt 56 securing a washer 58 against the nose 52 and a nut 60 threaded on the shaft end 48 so as to abut the hub 40.

Just downstream of the nose 52, about the tube 44, is a first annular wall 62 which is cup-shaped and which has a radially outwardly directed, annular seal section 64 which slidably and sealingly engages an interior surface 66 of the sleeve 26. The annular wall 62 is on the upstream side of the web 30 and a compression coil spring 68 is interposed between the annular wall 62 and the web 30 to bias the sleeve 26 toward the seat 24. The guide tube 44, at the interface between the annular wall 62 and the web 30 includes radial bores 70 extending from the center of the tube 44 to such interface. As a consequence, the space between the web 30 and the first annular wall 62 is in fluid communication with the outlet 14 of the valve.

The sleeve 26 includes an intermediate frusto-conical exterior surface 72 which merges with an enlarged diameter cylindrical end 74, the latter terminating in the annular valve surface 28. As a consequence of this construction, in addition to the biasing force provided by the spring 68, the pressure from the compressor received at the inlet 12 will act against the sleeve 26, principally on the frusto-conical surface 72, to provide a further urging of the sleeve 26 towards the closed or seated position illustrated in FIG. 1.

Just upstream from the struts 36 and 38, the tube 44 mounts a second annular wall 76 at a location downstream of the web 30. The annular wall 76 terminates in a radially outer, annular sealing section 78 which slidably and sealingly engages an inner surface 80 of the sleeve 26. The surface 80 is located interiorly of the sleeve 26 at locations corresponding to the enlarged diameter outer surface 74 and extends from the annular valve surface 28 to the web 30.

As can be seen in FIG. 1, the surface 82 of the web 30 facing a surface 84 of the second annular wall 76 is configured to be complementary so as to closely mate when the sleeve 30 is in the position shown abutting the valve seat 24. In the illustrated embodiment, a frusto-conical configuration is employed for the surface 82 while the surface 84 is in the form of a mating frusto-conical recess.

An area between the surfaces 82 and 84 is thus a variable volume chamber 86 defined by the web 30, the second annular wall 76, the sleeve 26 and the tube 44. Because of the mating configuration of the surfaces 82 and 84, the volume of the chamber 86, when the sleeve 26 is abutting the seat 24, will be minimized. As will be seen, this feature of the invention maximizes the response of the valve to an actuating signal.

The second annular wall 76 includes a face 88 abutting the hub of the spider 40. The face 88 is provided with an annular, axially opening groove 90 and a plurality of axially opening bores 92 extend from the groove to the chamber 86. The strut 36 is provided with a generally radially extending internal bore defining a passage and shown at 94. The bore 94 is plugged by a plug 96 at one end and at its opposite end extends to an axial bore 98 which in turn is in alignment with the groove 90.

A diagonally extending bore 100 is located in the body 10 to intersect the bore 94 between the plug 96 and the bore 98 and is connected to a three-way control valve, generally designated 102.

The valve 102 includes a first port 104 in fluid communication with the chamber 86 via the bores 100, 94 and 98, the groove 90 and the bores 92. The valve 102 also includes a second port 106 which is adapted to be connected to a conventional accumulator 108 which, of course, will store pressurized fluid at a desired pressure level.

Figures 2, 3:
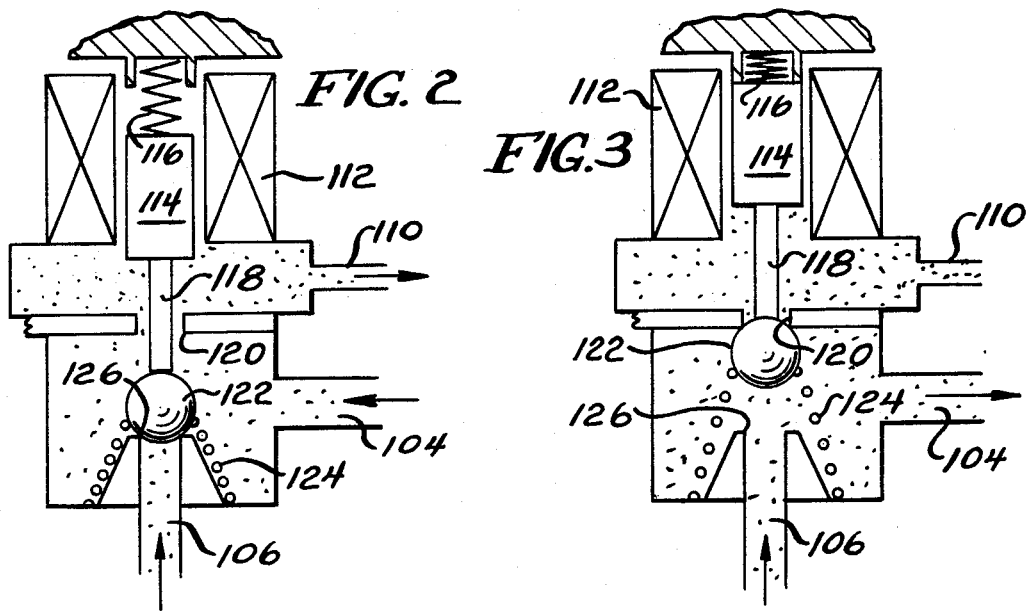
FIG. 2 is a somewhat schematic depiction of a three way control valve in its normal configuration.
FIG. 3 is a view similar to FIG. 2 but showing the configuration of the control valve when an impending stall signal has been received.

Finally, the valve 102 includes a third port 110 which is vented exteriorly of the valve 108 and the valve body 10 to ambient. As seen in FIGS. 2 and 3, the valve 102 is a solenoid operated valve including a solenoid winding 112 disposed about a movable armature 114. The armature 114 is spring biased by a compression coil spring 116. When the solenoid is not energized, a condition shown in FIG. 2, an extension 118 of the armature 114 will pass through a valve seat 120 located between the ports 104 and 110 to urge a valve member in the form of a ball 122 against the bias of a light spring 124 into engagement with a seat 126 associated with the port 106. As a consequence, when the solenoid is not energized, fluid communication between the first port 104 and the third port 110 is established and the chamber 82 will be vented.

Conversely, when the solenoid is energized, the armature 114 will be drawn into the coil 112 against the bias of the spring 116. The pressure applied to the ball 122 by the pressurized fluid in the accumulator 108 and/or the small bias provided by the spring 124 will move the ball to the position illustrated in FIG. 3 against the seat 120. As a consequence, fluid communication is established between the second port 106 and the first port 104; and the accumulator 108 will pressurize the chamber 86.

In operation, the coil 112 will normally not be energized. As a consequence, the sleeve valve 26 will seat against the seat 24 and occupy the solid line position illustrated in FIG. 1 as a result of the bias applied thereto by the spring 68 and inlet side pressure acting against the sleeve, and principally the surface 72 thereof. In this condition, no air will be bled from the compressor to the fan case via the valve body 10.

When an impending stall in the compressor section of the engine is detected by conventional detecting equipment (not shown), the solenoid coil 112 will be energized and the armature 114 moved to the position illustrated in FIG. 3. Consequently, pressurized fluid from the accumulator 108 will pass through the control valve 102 and ultimately to the chamber 86. This in turn will drive the sleeve 26 to the dotted line position illustrated in FIG. 1. Because the chamber 86 has minimal volume to begin with, the quantity of pressurized fluid required to achieve the necessary pressure buildup in the chamber 86 to move the sleeve to the dotted line position is likewise minimized. This, in turn, means that less time is expended in flowing the necessary pressurized fluid from the accumulator 108 to the chamber 86 to minimize response time of the valve.

A further improvement in response is achieved by means of the vent for the interface between the first annular wall 62 and the web 30 provided by the use of the guide tube 44, the presence of the radial ports 70 therein, and the location of the open end 46 at the outlet 14. It will be appreciated that in the usual case, when the valve is in the solid line position illustrated in FIG. 1, the pressure at the outlet 14 will be quite low as compared to the pressure at the inlet 12. Consequently, when pressurized fluid in the chamber 86 acts on the sleeve 26, there will be little compression of the fluid at the interface between the first annular wall 62 and the web 30 since the same is vented to a low pressure region in the manner just specified. The lack of any pressure build-up at the interface between the first annular wall 62 and the web 30 allows the sleeve to move freely to an open position against minimal resistance.

Employing the principles of the invention, a valve made essentially according to the scale illustrated in FIG. 1 and having a diameter of $3\frac{3}{8}$ inches will open and begin to exhaust bleed air into the fan duct in the relatively short time of 100 milliseconds with minimal actuating pressure from the accumulator.

I claim:

1. An in-line valve assembly for connection to at least one bleed air port in the compressor section of a turbine engine comprising:
    a generally cylindrical valve body having opposed open ends, one of said ends being adapted to serve as an inlet and the other of said ends being adapted to serve as an outlet;
    an annular valve seat within said body adjacent said other end;
    a sleeve of lesser diameter than said valve body within said valve body and including an annular valve surface adapted to sealingly abut said seat, said sleeve having an internal, generally diametral web intermediate its ends, said web having a central opening;
    at least one strut in said body extending generally radially inwardly at a location on the outlet side of said seat;
    an axial guide tube mounted on said strut and being directed through said central opening to slidably mount said sleeve for reciprocal movement toward and away from said seat, one end of said tube adjacent said outlet opening to said outlet to be in fluid communication therewith;
    a first annular wall mounted on said guide tube at the end thereof remote from said tube one end and slidably sealingly engaging the interior of said sleeve on one side of said web;
    compression spring means interposed between said first annular wall and said web for biasing said sleeve toward said seat;
    said guide tube opening to the interface between said first annular wall and said web to establish fluid communication between said interface and the interior of said tube, and thus, fluid communication between said interface and said outlet;
    a second annular wall on said tube between said seat and said web and slidably, sealingly engaging the interior of said sleeve;
    said web and said sleeve and said second annular wall defining a variable volume chamber for receiving a pressure signal adapted to bias said sleeve away from said seat;
    a fluid passage in said strut and extending through said second annular wall to be in fluid communication with said chamber;
    a three-way control valve having a first port connected to said fluid passage, a second port adapted to be connected to a source of fluid pressure, a third port adapted to be connected to vent, a valve member movable to all alternately establish fluid communication between said first and second ports of said first and third ports, and a valve chamber with opposed seats respectively associated with said second and third ports, said valve member being movable within said valve chamber between said seats with said first port opening to said valve chamber;
    a motor for selectively moving said valve member comprising a solenoid having a spring biased armature normally urging said valve member against the seat associated with said second port; and
    an accumulator in fluid communication with said second port and constituting said source of fluid pressure.

2. The in-line valve assembly of claim 1 wherein said web is a frusto-conical surface on its side facing said second annular wall and said second annular wall has a mating frusto-conical recess closely receiving said frusto-conical surface to minimize the volume of said chamber when said annular valve surface sealingly abuts said annular seat to thereby minimize the volume of said chamber when said annular valve surface abuts said annular valve seat to thereby maximize the response to said sleeve to said pressure signal.

3. A turbofan engine in combination with the in-line valve of claim 1 and wherein said turbofan engine includes a compressor section and a fan case;
    said inlet being connected to a stage of said compressor section and said outlet being connected to said fan case, said in-line valve being movable by a pressure signal from said accumulator from a fully-closed to a fully-opened position to bleed air from said compressor to said fan case to avoid compressor section stall in said engine.

4. The in-line valve of claim 1 wherein said second annular wall, oppositely of said sleeve, includes an annular, axially opening groove in fluid communication with said fluid passage and a plurality of axially opening bores extending from said groove through said second annular wall to said chamber.

* * * * *